United States Patent
Zhang (10) Patent No.: US 10,977,062 B2
(45) Date of Patent: Apr. 13, 2021

(54) SYSTEM FOR STARTING VIRTUAL MACHINE USING MIRROR IMAGE FILE STORED IN UNITS OF A DISTRIBUTED BLOCK STORAGE SYSTEM MAPPED TO UNITS OF A LOGICAL VOLUME

(71) Applicant: Beijing Baidu Netcom Science and Technology Co., Ltd., Beijing (CN)

(72) Inventor: Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 219 days.

(21) Appl. No.: 15/604,804

(22) Filed: May 25, 2017

(65) Prior Publication Data

US 2018/0129520 A1 May 10, 2018

(30) Foreign Application Priority Data

Nov. 7, 2016 (CN) .......................... 201611034112.4

(51) Int. Cl.
*G06F 9/455* (2018.01)
*H04L 29/08* (2006.01)
*G06F 9/50* (2006.01)

(52) U.S. Cl.
CPC ...... *G06F 9/45537* (2013.01); *G06F 9/45558* (2013.01); *G06F 9/5077* (2013.01);
(Continued)

(58) Field of Classification Search
CPC ............ G06F 9/45537; G06F 9/45558; G06F 9/5077; G06F 2009/45575; H04L 67/34; H04L 67/1095; H04L 67/10
See application file for complete search history.

(56) References Cited

U.S. PATENT DOCUMENTS 8,332,570 B1 * 12/2012 Cook ................... G06F 3/0613
711/137
8,806,489 B2 * 8/2014 Freimuth .................. G06F 8/63
709/223
(Continued)

OTHER PUBLICATIONS

VMware "Virtual Appliances: A New Paradigm for Software Delivery", © 2008. (Year: 2008).*
(Continued)

*Primary Examiner* — Meng Ai T An
*Assistant Examiner* — Michael W Ayers
(74) *Attorney, Agent, or Firm* — Nixon Peabody LLP (57) ABSTRACT

A method and apparatus for starting a virtual machine. A specific implementation of the method comprises: acquiring, by a physical machine, a mirror image file required for starting a to-be-started target virtual machine from a distributed block storage system, in response to an entered instruction to start the target virtual machine; and starting the target virtual machine by using the mirror image file. The mirror image file required for starting the virtual machine is stored in the cloud-based distributed block storage system, and a virtual disk is mapped to the physical machine. When the physical machine needs to start the virtual machine, the mirror image file required for starting the virtual machine is acquired from the cloud-based distributed block storage system by reading the virtual disk.

14 Claims, 4 Drawing Sheets (52) U.S. Cl.
CPC .......... *H04L 67/1095* (2013.01); *H04L 67/34* (2013.01); *G06F 2009/45575* (2013.01); *H04L 67/10* (2013.01)

(56) References Cited

U.S. PATENT DOCUMENTS

| | | | | |
|---|---|---|---|---|
| 2006/0085522 | A1* | 4/2006 | Spry | H04L 61/2015 |
| | | | | 709/220 |
| 2010/0088699 | A1* | 4/2010 | Sasaki | G06F 8/63 |
| | | | | 718/1 |
| 2011/0010515 | A1* | 1/2011 | Ranade | G06F 11/1451 |
| | | | | 711/162 |
| 2012/0324446 | A1* | 12/2012 | Fries | G06F 21/64 |
| | | | | 718/1 |
| 2013/0055249 | A1* | 2/2013 | Vaghani | G06F 9/45558 |
| | | | | 718/1 |
| 2013/0081014 | A1* | 3/2013 | Kadatch | G06F 3/067 |
| | | | | 718/1 |
| 2013/0132950 | A1* | 5/2013 | McLeod | G06F 8/63 |
| | | | | 718/1 |
| 2013/0227564 | A1* | 8/2013 | Asayama | G06F 9/45558 |
| | | | | 718/1 |
| 2014/0033189 | A1* | 1/2014 | Buswell | G06F 9/45558 |
| | | | | 717/170 |
| 2017/0012904 | A1* | 1/2017 | Matzek | H04L 67/1002 |
| 2017/0300695 | A1* | 10/2017 | He | H04L 29/06 |

OTHER PUBLICATIONS

Hui C., "A Data Persistence System for Virtual Machines in Cloud Environment," Huazhong University of Science and Technology, Wuhan 430074, P.R. China, Mar. 15, 2013 (57 pages) (w/English abstract).

\* cited by examiner

SYSTEM FOR STARTING VIRTUAL MACHINE USING MIRROR IMAGE FILE STORED IN UNITS OF A DISTRIBUTED BLOCK STORAGE SYSTEM MAPPED TO UNITS OF A LOGICAL VOLUME

CROSS-REFERENCE TO RELATED APPLICATION

This application claims the priority of Chinese Patent Application No. 201611034112.4, entitled "Method and Apparatus for Starting Virtual Machine," filed on Nov. 7, 2016, the content of which is incorporated herein by reference in its entirety.

TECHNICAL FIELD

The present application relates to the technical field of cloud computing, particularly to the technical field of virtual machines, and more particularly to a method and apparatus for starting a virtual machine start.

BACKGROUND

Virtualization services are commonly used services provided by a cloud computing platform. At present, when the cloud computing platform provides a virtualization service, a mirror image file required for starting a virtual machine is generally stored in a physical machine running the virtual machine. The required mirror image file is read to start the virtual machine at the time when the virtual machine is started on the physical machine.

However, after starting the virtual machine as described above, the user data may be lost, in the event of a failure in the physical machine. The exact recovery time may also not be determined, thus affecting the normal operation of the virtualization services.

SUMMARY

The present application provides a method and apparatus for starting a virtual machine start, in order to solve the technical problem mentioned in the foregoing Background section.

In a first aspect, the present application provides a method for starting a virtual machine. The method includes: acquiring, by a physical machine, a mirror image file required for starting a to-be-started target virtual machine from a distributed block storage system, in response to an entered instruction to start the target virtual machine; and starting the target virtual machine by using the mirror image file.

In a second aspect, the present application provides an apparatus for starting a virtual machine. The apparatus includes a response unit, configured to acquire a mirror image file required for starting a to-be-started target virtual machine from a distributed block storage system, in response to an entered instruction to start the target virtual machine; and a starting unit, configured to start the target virtual machine by using the mirror image file.

According to the method and apparatus for starting a virtual machine start provided in the present application, the physical machine acquires a mirror image file required for starting a to-be-started target virtual machine from a distributed block storage system, in response to an entered instruction to start the target virtual machine; and the target virtual machine is started by using the mirror image file. The mirror image file required for starting the virtual machine is stored in the cloud-based distributed block storage system, and a virtual disk is mapped to the physical machine. When the physical machine needs to start the virtual machine, the mirror image file required for starting the virtual machine is acquired from the cloud-based distributed block storage system by reading the virtual disk. In the event of a failure in a local physical machine running the virtual machine, the virtual machine may be started immediately by acquiring the mirror image file through the virtual disk mapped to an additional physical machine, thereby ensuring the normal operation of virtualization services.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
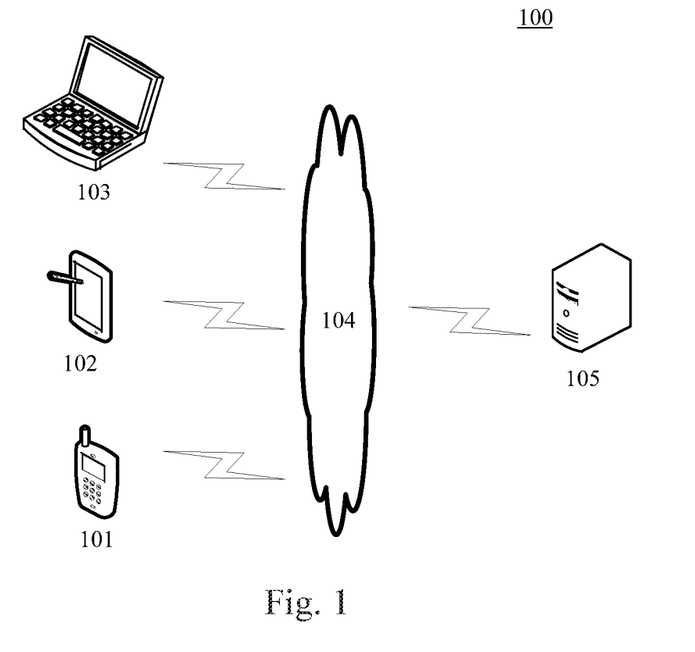
FIG. 1 is an architectural diagram of an exemplary system in which the embodiments of the method and apparatus for starting a virtual machine of the present application may be implemented.

FIG. 1 shows an exemplary architecture of a system 100 which may be used by the method and apparatus for starting a virtual machine according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as cloud storage applications, shopping applications, search applications, instant messaging tools, mailbox clients, social platform software, etc. may be installed on the terminal devices 101, 102 and 103.

The terminal devices 101, 102 and 103 may be various electronic devices having a display screen and supporting network communication, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server provided with a distributed block storage system. The server 105 may provide services to the terminal devices 101, 102 or 103, for example, virtualization service, and create virtual machines on the terminal devices 101, 102 or 103.

Figure 2:
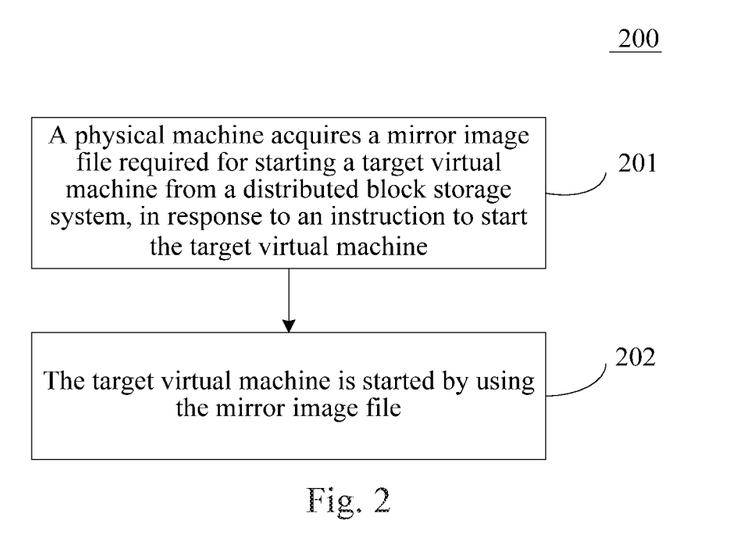
FIG. 2 shows a flow chart of an embodiment of a method for starting a virtual machine according to the present application.

Referring to FIG. 2, showing a process flow 200 of an embodiment of a method for starting a virtual machine according to the present application. It should be noted that the method for starting a virtual machine provided in the embodiment of the present application may be implemented by the terminal equipment 101, 102, and 103 shown in FIG. 1. Accordingly, an apparatus may be provided in the terminal equipment 101, 102, and 103. The method includes the following steps.

Step 201: A physical machine acquires a mirror image file required for starting a target virtual machine from a distributed block storage system, in response to an instruction to start the target virtual machine.

In this embodiment, a to-be-started target virtual machine may be disposed in a terminal, and the terminal running the target virtual machine is referred to as a physical machine. To start the target virtual machine on the physical machine, a mirror image file required for starting the target virtual machine needs to be acquired.

In this embodiment, the mirror image file required for starting the target virtual machine may be previously stored in a distributed block storage system. When the physical machine receives an entered instruction to start the target virtual machine, the mirror image file required for starting the target virtual machine may be acquired from the distributed block storage system. For example, a user of the physical machine selects a target virtual machine on a virtual machine start interface and clicks a start button, to generate an instruction to start the target virtual machine. After receiving the entered start instruction, a mirror image file required for starting the target virtual machine is acquired from the distributed block storage system.

In some optional implementations of this embodiment, before the physical machine acquires a mirror image file required for starting a to-be-started target virtual machine from a distributed block storage system, in response to the entered instruction to start the target virtual machine, the method further includes: receiving an entered block storage application instruction comprising a size of a system disk in the target virtual machine; allocating a logical volume of the size by using a logical volume manager; and storing an identifier of the logical volume in correspondence with the target virtual machine.

In this embodiment, before starting the target virtual machine, the physical machine may receive the entered block storage application instruction including a size of the system disk in the target virtual machine. For example, a user of the physical machine may select the size of the system disk in the target virtual machine on a virtual machine configuration page, and click the block storage application button, to generate the block storage application instruction. The physical machine may send an allocation request comprising the size of the system disk in the target virtual machine to a cloud server, and a logical volume manager on the cloud server allocates a logical volume of the size of the system disk in the target virtual machine. A corresponding relation is then established between the logical volume and the target virtual machine. The logical volume manager may manage logical volumes, and the logical volume specifically used by the virtual machine, and an identifier for the logical volume may be recorded in metadata of the virtual machine. The logical volume manager may provide mapping between blocks of the logical volume and storage units in the distributed block storage system.

In some optional implementations of this embodiment, before the physical machine acquires the mirror image file required for starting the to-be-started target virtual machine from the distributed block storage system, in response to the entered instruction to start the target virtual machine, the method further includes: mapping the logical volume as a virtual disk by using the target in the Internet Small Computer System Interface (iSCSI) protocol, namely the iSCSI target; mapping the virtual disk to the physical machine by using the initiator in the iSCSI protocol, namely the iSCSI initiator; formatting the virtual disk, and mounting the formatted virtual disk onto a preset mounting point.

In this embodiment, after determining the logical volume corresponding to the target virtual machine, the logical volume corresponding to the target virtual machine is mapped as a virtual disk by the iSCSI target, and the logical volume is mapped as a block device to the iSCSI initiator. The iSCSI initiator may be connected to a storage service port provided by the iSCSI target, and maps the virtual disk to the physical machine. Accordingly, the virtual disk is added to the physical machine. The virtual disk may correspond to a device file. The device file is, for example, /dev/sdx. The virtual disk may be formatted, for example, the virtual disk is formatted into an ext4 file system. The formatted virtual disk is then mounted onto a preset mounting point on the physical machine by a mount command. For example, the preset mounting point is /home/bcc/mydir, and the virtual disk is mounted onto the preset mounting point by inputting the command mount /dev/sdx /home/bcc/mydir. A write operation or a read operation performed on the mounted virtual disk on the physical machine may be finally converted into writing data into the distributed block storage system or reading data from the distributed block storage system.

In some optional implementations of this embodiment, before the physical machine acquires a mirror image file required for starting a to-be-started target virtual machine from a distributed block storage system, in response to the entered instruction to start the target virtual machine, the method further includes: writing the mirror image file required for starting the target virtual machine into the formatted virtual disk, so as to write the mirror image file required for starting the target virtual machine into the distributed block storage system.

In this embodiment, the iSCSI target may be extended by adding a drive. The drive in the iSCSI target may encapsulate the write and read operations performed on the virtual disk. During the write and read operations, the drive in the iSCSI target may determine a storage unit in the distributed block storage system, according to the correspondence relation between the storage units of blocks of logical volumes in the logical volume manager and the storage units in the distributed block storage system, and write data into the storage unit in the distributed block storage system or read data from the storage unit in the distributed block storage system.

In this embodiment, before starting the target virtual machine, the physical machine may first write the mirror image file required for starting the target virtual machine into the formatted virtual disk. And the mirror image file required for starting the target virtual machine is ultimately written by the driver in the iSCSI target into a storage unit in the distributed block storage system corresponding to the virtual disk. When the physical machine needs to start the target virtual machine, the mirror image file required for starting the target virtual machine is read from the virtual disk, and the mirror image file required for starting the target virtual machine is ultimately read by the driver in the iSCSI target from the storage unit in the distributed block storage system corresponding to the virtual disk.

Step 202: The target virtual machine is started by using the mirror image file.

In this embodiment, after the mirror image file required for starting the target virtual machine is acquired from the distributed block storage system in Step 201, the target virtual machine is started by using the mirror image file.

In this embodiment, the virtual machine and the mirror image file required for starting the virtual machine may be deleted when the target virtual machine is no longer used. The virtual disk is unmounted, and the iSCSI session is terminated. Meanwhile, the mapping of the logical volume to the virtual disk is deleted, and the mirror image file required for starting the target virtual machine is deleted from the distributed block storage system.

In some optional implementations of this embodiment, the method further includes: mapping the logical volume as the virtual disk by an additional physical machine using a target of the iSCSI protocol, when a monitoring process finds a failure in the physical machine; and mapping the virtual disk to the additional physical machine by using the initiator of the iSCSI protocol, to start the target virtual machine on the additional physical machine.

In this embodiment, the operation of each physical machine may be monitored by a monitoring process. Taking physical machine A and physical machine B as an example, the target virtual machine initially runs on physical machine A. When a failure is found in physical machine A, the target virtual machine may be migrated to physical machine B. Physical machine B obtains the identifier of the logical volume of the target virtual machine to be migrated by reading the metadata of the virtual machine. Physical machine B may map the logical volume of the target virtual machine as the virtual disk by using an iSCSI target, and map the virtual disk to physical machine B by using the iSCSI initiator. The virtual disk corresponds to a device file, for example /dev/sdy. The virtual disk may be directly mounted onto a preset mounting point on physical machine B. For example, the preset mounting point is /home/bcc/ mydir, and the virtual disk is mounted onto the preset mounting point by inputting the command mount /dev/sdy /home/bcc/mydir. Using this approach, the virtual disk is added to the physical machine. The target virtual machine is started on physical machine B by reading the virtual disk to acquire the mirror image file required for starting the target virtual machine.

Figure 3:
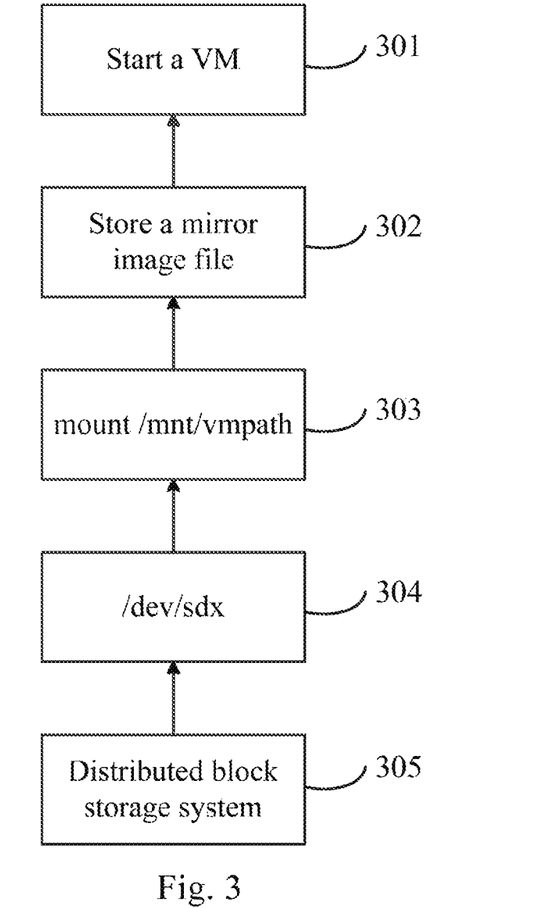
FIG. 3 shows an exemplary flow chart of a for starting a virtual machine according to the present application.

FIG. 3 shows an exemplary flow chart of a method for starting a virtual machine according to the present application.

A logical volume corresponding to a target virtual machine is determined first. After the logical volume corresponding to the target virtual machine is determined, the logical volume corresponding to the target virtual machine is mapped as a virtual disk by an iSCSI target, and the virtual disk is mapped by an iSCSI initiator to a physical machine. In this way, the virtual disk is added to the physical machine. The virtual disk corresponds to a device file, for example, /dev/sdx 304. The virtual disk may be formatted, and the formatted virtual disk is mounted onto a preset mounting point on the physical machine by a mount command, for example, by mount /mnt/vmpath 303. After the virtual disk is formatted, a mirror image file required for starting the target virtual machine is written into the virtual disk, whereby the mirror image file 302 required for starting the target virtual machine is stored in a distributed block storage system 305. When the physical machine needs to start the target virtual machine, the mirror image file required for starting the target virtual machine is acquired from the distributed block storage system through the virtual disk, to start the target virtual machine, namely the VM 301.

Figure 4:
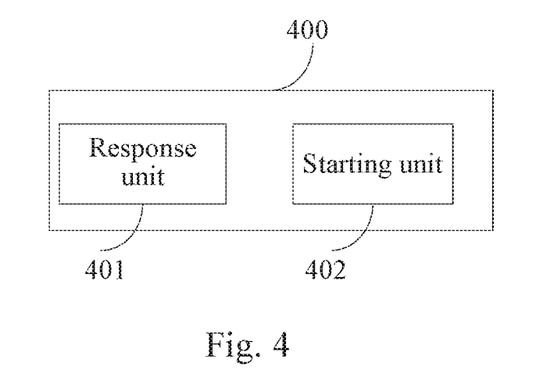
FIG. 4 shows a schematic structural diagram of an embodiment of an apparatus for starting a virtual machine according to the present application.

Referring to FIG. 4, as an implementation of the method shown in the preceding figures, the present application provides an embodiment of an apparatus for starting a virtual machine, corresponding to the method embodiment shown in FIG. 2.

As shown in FIG. 4, an apparatus for starting a virtual machine 400 of this embodiment includes a responding unit 401, and a starting unit 402. The responding unit 401 is configured to acquire a mirror image file required for starting a to-be-started target virtual machine from a distributed block storage system, in response to an entered instruction to start the target virtual machine; and the starting unit 402 is configured to start the target virtual machine by using the mirror image file.

In some optional implementations of this embodiment, the apparatus 400 further includes a logical volume allocation unit (not shown), configured to receive an entered block storage application instruction comprising a size of a system disk in the target virtual machine, before the acquisition of a mirror image file required for starting the to-be-started target virtual machine from the distributed block storage system, in response to the entered instruction to start the target virtual machine; allocate a logical volume of the size by using a logical volume manager; and store an identifier of the logical volume in correspondence with the target virtual machine; a mapping unit (not shown), configured to map the logical volume as a virtual disk by using the target of the iSCSI protocol; map the virtual disk to the physical machine by using the initiator of the iSCSI protocol; and format the virtual disk, and mount the formatted virtual disk onto a preset mounting point; and a writing unit (not shown), configured to write the mirror image file required for starting the target virtual machine into the formatted virtual disk, in order to write the mirror image file required for starting the target virtual machine into the distributed block storage system.

In some optional implementations of this embodiment, the starting unit 402 includes a reading subunit (not shown), configured to read the mirror image file required for starting the target virtual machine in the virtual disk, in order to read the mirror image file required for starting the target virtual machine from the distributed block storage system.

In some optional implementations of this embodiment, the apparatus 400 further includes a switching over unit (not shown), configured to map the logical volume as the virtual disk by an additional physical machine using the target of the iSCSI protocol when a monitoring process finds a failure in the physical machine; and map the virtual disk to the additional physical machine by using the initiator of the iSCSI protocol, in order to start the target virtual machine on the additional physical machine.

Figure 5:
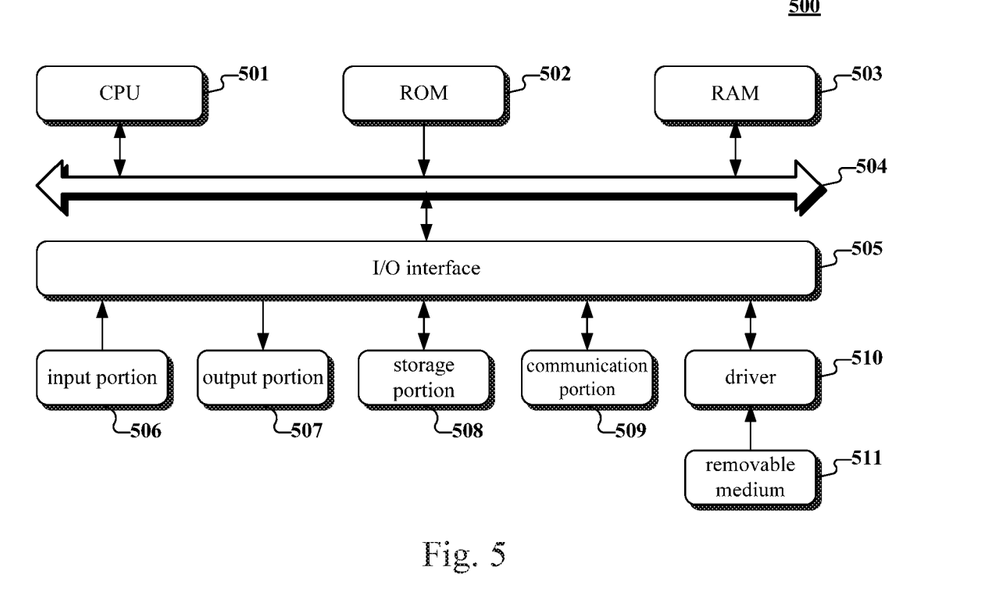
FIG. 5 illustrates a structural schematic diagram of a computer system adapted to implement the embodiments of the method and apparatus for starting a virtual machine of the present application.

FIG. 5 illustrates a schematic structural diagram of a computer system 500 adapted to implement an apparatus for starting a virtual machine of the embodiments of the present application. As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more program. The one or more program, when executed by one or more device, cause the device to acquire, by a physical machine, a mirror image file required for starting a to-be-started target virtual machine from a distributed block storage system, in response to an entered instruction to start the target virtual machine.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for starting a virtual machine, comprising:
receiving an entered block storage application instruction comprising a size of a system disk to be allocated to a target virtual machine;
allocating a logical volume of the size to the target virtual machine by using a logical volume manager on a cloud server;
storing an identifier of the logical volume in correspondence with the target virtual machine, the logical volume manager mapping between storage units of the logical volume and storage units of a distributed block storage system;
storing a mirror image file required for starting the target virtual machine in the storage units of the distributed block storage system; mapping the logical volume indicated by the identifier as a virtual disk corresponding to the target virtual machine, and mapping the virtual disk to a physical machine;
receiving an entered instruction to start the target virtual machine;
acquiring, by the physical machine, the mirror image file required for starting the target virtual machine from the distributed block storage system by reading the storage units of the logical volume mapped as the virtual disk corresponding to the storage units of the distributed block storage system; and
starting the target virtual machine by using the mirror image file.

2. The method according to claim 1, wherein the mapping the logical volume indicated by the identifier as the virtual disk is carried out using a target of the Internet Small Computer System Interface (iSCSI) protocol;
and the mapping the virtual disk to the physical machine comprises;
mapping the virtual disk to the physical machine by using an initiator of the iSCSI protocol; and
formatting the virtual disk, and mounting the formatted virtual disk onto a preset mounting point on the physical machine.

3. The method according to claim 2, wherein the storing the mirror image file required for starting the target virtual machine in the distributed block storage system comprises:
writing the mirror image file required for starting the target virtual machine into the distributed block storage system by writing the mirror image file required for starting the target virtual machine into the formatted virtual disk.

4. The method according to claim 3, wherein the acquiring the mirror image file required for starting the target virtual machine from the distributed block storage system comprises:
reading the mirror image file required for starting the target virtual machine from the distributed block storage system by reading the mirror image file required for starting the target virtual machine in the formatted virtual disk.

5. The method according to claim 4, wherein before the mapping the virtual disk to the physical machine, the method further comprises:
mapping the logical volume as the virtual disk to an additional physical machine using a target of the iSCSI protocol, when a monitoring process finds a failure in the physical machine; and
mapping the virtual disk to the additional physical machine by using an initiator of the iSCSI protocol, in order to start the target virtual machine on the additional physical machine.

6. An apparatus for starting a virtual machine, comprising:
at least one processor; and
a memory storing instructions, which when executed by the at least one processor, cause the at least one processor to perform operations, the operations comprising:
receiving an entered block storage application instruction comprising a size of a system disk to be allocated to a target virtual machine;
allocating a logical volume of the size to the target virtual machine by using a logical volume manager on a cloud server; and
storing an identifier of the logical volume in correspondence with the target virtual machine, the logical volume manager mapping between storage units of the logical volume and storage units of a distributed block storage system;
storing a mirror image file required for starting the target virtual machine from the storage units of the distributed block storage system: mapping the logical volume indicated by the identifier as a virtual disk corresponding to the target virtual machine, and mapping the virtual disk to a physical machine;
receiving an entered instruction to start the target virtual machine;
acquiring the mirror image file required for starting the target virtual machine from the distributed block storage system by reading the storage units of the logical volume mapped as the virtual disk corresponding to the storage units of the distributed block storage system; and
starting the target virtual machine by using the mirror image file.

7. The apparatus according to claim 6, wherein the mapping the logical volume indicated by the identifier as the virtual disk is carried out using a target of the Internet Small Computer System Interface (iSCSI) protocol;
and the mapping the virtual disk to the physical machine comprises;
mapping the virtual disk to the physical machine by using an initiator of the iSCSI protocol; and
formatting the virtual disk and mounting the formatted virtual disk onto a preset mounting point on the physical machine; and
wherein the storing the mirror image file required for starting the target virtual machine in the distributed block storage system comprises:
writing the mirror image file required for starting the target virtual machine into the distributed block storage system by writing the mirror image file required for starting the target virtual machine into the formatted virtual disk.

8. The apparatus according to claim 7, wherein the acquiring the mirror image file required for starting the target virtual machine from the distributed block storage system comprises:
reading the mirror image file required for starting the target virtual machine from the distributed block storage system by reading the mirror image file required for starting the target virtual machine in the formatted virtual disk.

9. The apparatus according to claim 8, wherein before the mapping the virtual disk to the physical machine; the operations further comprise:
mapping the logical volume as the virtual disk to an additional physical machine using a target of the iSCSI protocol when a monitoring process finds a failure in the physical machine; and mapping the virtual disk to the additional physical machine by using an initiator of the iSCSI protocol, in order to start the target virtual machine, on the additional physical machine.

10. A non-transitory computer storage medium storing a computer program, which when executed by one or more processors, cause the one or more processors to perform operations, the operations comprising:
receiving an entered block storage application instruction comprising a size of a system disk to be allocated to a target virtual machine;
allocating a logical volume of the size to the target virtual machine by using a logical volume manager on a cloud server;
storing an identifier of the logical volume in correspondence with the target virtual machine, the logical volume manager mapping between storage units of the logical volume and storage units of a distributed block storage system;
storing a mirror image file required for starting the target virtual machine in the storage units of the distributed block storage system; mapping the logical volume indicated by the identifier as a virtual disk corresponding to the target virtual machine, and mapping the virtual disk to a physical machine;
receiving an entered instruction to start the target virtual machine;
acquiring, by the physical machine, the mirror image file required for starting the target virtual machine from the distributed block storage system by reading the storage units of the logical volume mapped as the virtual disk corresponding to the storage units of the distributed block storage system; and
starting the target virtual machine by using the mirror image file.

11. The non-transitory computer storage medium according to claim 10, wherein the mapping the logical volume indicated by the identifier as the virtual disk is carried out by using a target of the Internet Small Computer System Interface (iSCSI) protocol;

and the mapping the virtual disk to the physical machine comprises:

mapping the virtual disk to the physical machine by using an initiator of the iSCSI protocol; and formatting the virtual disk, and mounting the formatted virtual disk onto a preset mounting point on the physical machine.

12. The non-transitory computer storage medium according to claim 11, wherein the storing the mirror image file required for starting the target virtual machine in the distributed block storage system comprises:

writing the mirror image file required for starting the target virtual machine into the distributed block storage system by writing the mirror image file required for starting the target virtual machine into the formatted virtual disk.

13. The non-transitory computer storage medium according to claim 12, wherein the acquiring the mirror image file required for starting the target virtual machine from the distributed block storage system comprises:

reading the mirror image file required for starting the target virtual machine from the distributed block storage system by reading the mirror image file required for starting the target virtual machine in the formatted virtual disk.

14. The non-transitory computer storage medium according to claim 13, wherein before the mapping the virtual disk to the physical machine, the operations further comprise:

mapping the logical volume as the virtual disk to an additional physical machine using a target of the iSCSI protocol, when a monitoring process finds a failure in the physical machine; and mapping the virtual disk to the additional physical machine by using an initiator of the iSCSI protocol, in order to start the target virtual machine on the additional physical machine.

* * * * *